(12) United States Patent
Berg

(10) Patent No.: US 7,624,231 B2
(45) Date of Patent: Nov. 24, 2009

(54) MAP BASED STRIPING OF DATA IN A DISTRIBUTED VOLATILE MEMORY ENVIRONMENT

(75) Inventor: Douglas Charles Berg, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 394 days.

(21) Appl. No.: 11/564,574

(22) Filed: Nov. 29, 2006

(65) Prior Publication Data

US 2008/0126695 A1 May 29, 2008

(51) Int. Cl.
*G06F 12/00* (2006.01)
(52) U.S. Cl. .................. 711/114; 711/164; 711/145; 707/10
(58) Field of Classification Search .................. None
See application file for complete search history.

(56) References Cited

U.S. PATENT DOCUMENTS

| 4,092,732 | A | 5/1978 | Ouchi | |
|---|---|---|---|---|
| 7,085,904 | B2 * | 8/2006 | Mizuno et al. | 711/162 |
| 7,340,555 | B2 * | 3/2008 | Ashmore et al. | 710/313 |
| 2006/0271734 | A1 * | 11/2006 | Strange et al. | 711/114 |
| 2007/0168610 | A1 * | 7/2007 | Kobayshi et al. | 711/114 |

OTHER PUBLICATIONS

IBM Corporation, ObjectGrid, http://publib.boulder.ibm.com/ infocenter, website article, Apr. 19, 2006, (3 pages).
Gigaspaces, www.gigaspaces.com, website, downloaded Jun. 23, 2006 (2 pages).
Tangosol, www.tangosol.com, website, downloaded Jun. 23, 2006, copyright 2000-2006 (1 page).

* cited by examiner

*Primary Examiner*—Jack A Lane
(74) *Attorney, Agent, or Firm*—Wood Herron & Evans LLP

(57) ABSTRACT

An apparatus, program product and method stripe value data associated with each of a plurality of keyed data sets across a plurality of processes in a data process set and accessing a first keyed data set among the plurality of keyed data sets using at least one of the plurality of processes. Value data is striped by dividing a keyed data set among the plurality of keyed data sets across the plurality of processes in the data process set based on a striping strategy.

25 Claims, 6 Drawing Sheets

MAP BASED STRIPING OF DATA IN A DISTRIBUTED VOLATILE MEMORY ENVIRONMENT

FIELD OF THE INVENTION

The present invention generally relates to computers and data communication and, more particularly, to caching data in a data cache in a distributed environment.

BACKGROUND OF THE INVENTION

A new industry is developing around data storage that is not database related. Applications in this industry often involve vast amounts of data that are continually changing. One such application, for example, involves storing data from a stock market. This particular application creates a unique problem due to the fact that stock data is both voluminous and frequently accessed, but the frequency that the data is updated varies widely. In particular, some stocks in the stock market are traded frequently and will have continually changing value data resulting in a large amount of reads and frequent writes. Most other stocks, however, trade relatively infrequently, and value data will typically not change much but will still be subjected to a significant amount of read operations. Because of the volatility of the data and the immediacy of the need for the data there is a need to have large amounts of data accessible all the time. A way to address this need is to retain all of the data in volatile local memory, typically in a volatile data structure referred to as a cache.

Various memory-caching solutions store objects in memory based on a key value. This is similar in concept to a database but generally these solutions are in quick access objects and not generally used for persistence. With key-based access, a data set is associated with a key value, and in order to retrieve the data set, the key value must be provided, in much the same manner as an index.

One problem that arises for these solutions is scalability in volatile memory. For example, in a 32 bit environment such as a 32-bit JAVA® programming environment, there is at most 2 GB of addressable memory available in any process. When the amount of data that needs to be stored is greater than 2 GB, often a more expensive and complex 64-bit architecture is required. Alternatively, data can be partitioned across multiple processes by key, e.g., so that data associated with different groups of keys is accessible in different processes.

There are inefficiencies, however, in these conventional approaches. For instance, with a 64-bit architecture, replicating several gigabytes or terabytes of data from one 64-bit address space to another can take a significant amount of time, which can complicate high availability environments. Garbage collection (attempting to reclaim memory used by objects that will never again be accessed by the application) can also cause problems in very large caches due to the need to use resources to locate non-addressable objects in a massive heap.

Partitioning by key reduces the amount of data any individual partition must store but at the cost of transactional complexity. In moderately complex applications, data must be accessed and updated across partitions resulting in two-phase transaction protocols across these partitions, which can be slow and blocking.

Traditional partitioning processes use a hash function or hash algorithm on the key for each keyed data set, and then replicate the data based on the hashing function for availability. A problem associated with partitioning is the need to access multiple processes when accessing multiple keys during a transaction. This takes time and slows the data access process. Additionally there are some applications that cannot be partitioned or do not partition well.

Another problem is availability. The data must be kept redundantly such that software, hardware, or network failures can be masked. This is generally accomplished through data replication from a primary process to a replica process or processes, resulting in a complete copy of all the data in the partition. This becomes problematic when the data becomes so large that the time to replicate or recover takes too long.

Each of the above mentioned solutions have common problems in that each requires replication of data or partitioning and communicating with multiple partitions, adding considerable time to the solution by either the replication of extremely large amounts of data or the accessing of multiple processes to retrieve multiple sets of keyed data. Accordingly, there is a need in the art for an improved way of storing and accessing large amounts of keyed data in volatile memory without adding significant time for replication or complexity of access.

SUMMARY OF THE INVENTION

The invention addresses these and other problems associated with the prior art by providing an apparatus, a program product, and a method that utilize data striping to stripe keyed data from a keyed data set across multiple processes. As such, a key associated with a given data set may be provided to multiple processes in order to access the data in the data set. Striping the data across multiple processes addresses many of the availability and scalability concerns with conventional caching designs, while also reducing the memory utilization within each process.

Consistent with one aspect of the invention, data may be cached by striping value data associated with each of a plurality of keyed data sets across a plurality of processes in a data process set. The data may then be accessed by accessing a first keyed data set among the plurality of keyed data sets using at least one of the processes in the plurality of processes.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

These and other features of the present invention will be apparent with reference to the following description and drawings wherein.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments may have been enlarged or distorted relative to others to facilitate visualization and clear understanding. In particular, thin features may be thickened, for example, for clarity or illustration.

DETAILED DESCRIPTION

The embodiments described hereinafter utilize a method for striping the value data of a key-value pair in a keyed data set across multiple host processes, such that each process hosts a portion of the object value for every key. Embodiments shown utilize a cache framework, where keyed data sets are stored in volatile memory cache for fast access, but the invention is not limited to cache frameworks. A keyed data set is a type of data set comprising multiple data values disposed, for example, in objects or records. Each object or record in a keyed data set is associated with a unique key with all objects or records sharing the same key forming the data for a single keyed data set. Objects or records may be randomly accessed based on their key and may be of variable length.

The processes that collectively store keyed data sets in a cache framework are referred to herein as a process set. Processes are characterized as independent computer tasks having dedicated sets of resources, including dedicated memory address spaces allocated thereto. Processes typically own a set of resources allocated by an operating system, which may include memory, file handles, sockets, device handles, and windows. Processes generally do not share address spaces or file resources with one another except through explicit methods such as inheriting file handles or shared memory segments and generally interact with each other only through system-provided inter-process communication mechanisms. Processes from a process set may be disposed within the same computer and/or may be distributed among multiple computers.

Hardware and Software Environment

Figure 1:
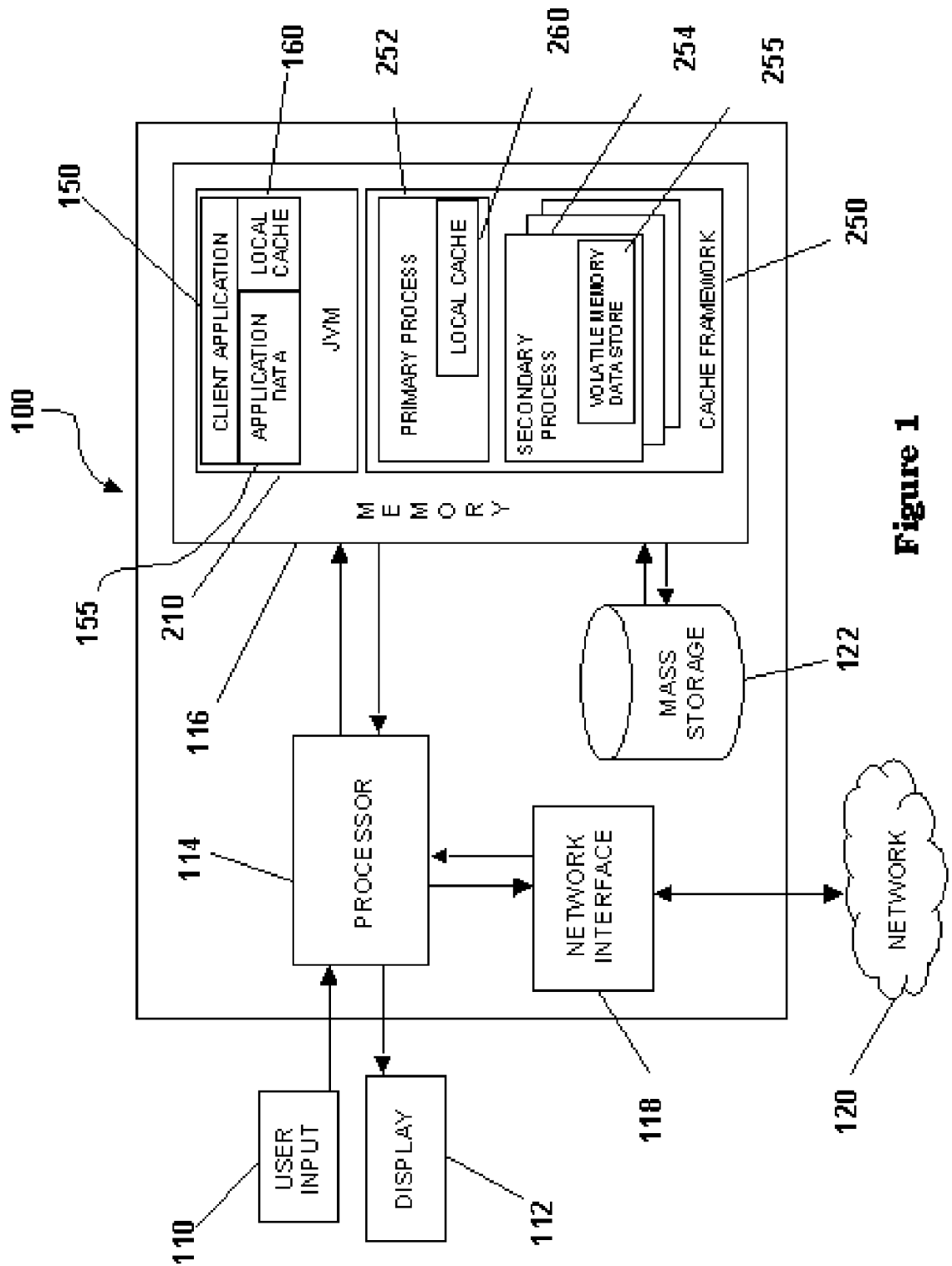
FIG. 1 is a block diagram of an exemplary hardware and software environment for a generic computer utilizing a cache framework incorporating data striping consistent with the invention.

Turning to the drawings, wherein like numbers denote like parts throughout the several views, FIG. 1 illustrates an exemplary hardware and software environment for an apparatus 100 consistent with the invention. For the purposes of the invention, apparatus 100 may represent any programmable device with a user input 110, a processor 114 with a memory 116, a mass storage device 122, a network interface 118, and an optional display 112. For the purposes of the invention, apparatus 100 may represent any programmable device capable of communicating with other computers or programmable devices via packet-based communication, for example multi-user or single-user computers, desktop computers, portable computers and devices, handheld devices, network devices, mobile phones, etc. Apparatus 100 will hereinafter be referred to as a "computer" although it should be appreciated that the term "apparatus" may also include other suitable programmable electronic devices.

Computer 100 typically includes at least one processor 114 coupled to a memory 116 and network interface 118. Processor 114 may represent one or more processors (e.g. microprocessors), and memory 116 may represent the random access memory (RAM) devices comprising the main storage of computer 100, as well as any supplemental levels of memory, e.g., cache memories 160, non-volatile or backup memories (e.g. programmable or flash memories), read-only memories, etc. In addition, memory 116 may be considered to include memory storage physically located elsewhere in computer 100, e.g., any cache memory in a processor (not shown), as well as any storage capacity used as a virtual memory, e.g., as stored on a mass storage device 122 or another computer coupled to computer 100 via a network 120.

Computer 100 also typically receives a number of inputs and outputs for communicating information externally. For interface with a user or operator, computer 100 typically includes one or more user input devices 110 (e.g., a keyboard, a mouse, a trackball, a joystick, a touchpad, a keypad, a stylus, and/or a microphone, among others). Computer 100 may also include a display 112 (e.g., a CRT monitor, an LCD display panel, and/or a speaker, among others). The interface to computer 100 may also be through an external terminal connected directly or remotely to computer 100, or through another computer communicating with computer 100 via a network 120, modem, or other type of communications device.

Computer 100 operates under the control of an operating system (not shown), and executes or otherwise relies upon various computer software applications, such as client application 150, components, programs, objects, modules, data structures, etc. Moreover, various applications, components, programs, objects, modules, etc. may also execute on one or more processors in another computer coupled to computer 100 via a network 120, e.g., in a distributed computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions will be referred to herein as "computer program code", or simply "program code". The computer program code typically comprises one or more instructions that are resident at various times in various memory and storage devices in a computer, and that, when read and executed by one or more processors in a computer, causes that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable signal bearing media include, but are not limited to, tangible, recordable type media such as volatile and non-volatile memory devices, floppy and other removable disks, hard disk drives, optical disks (e.g., CD-ROM's, DVD's, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature. For example the RAID style striping strategy may be replaced with any suitable striping strategy.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Striped Data in Distributed Volatile Memory

The memory 116 in FIG. 1 contains a client application 150 and a cache framework 250. The client application 150 running in the memory 116 has a local volatile memory area, which may hold a portion of the application data 155 associated with the client application. Likewise, a cache 160, local to the client application 150, may be utilized for temporary volatile storage. The cache framework 250 in memory 116 is available to and communicates with the client application 150 to read and write data. The cache framework 250 comprises a primary process 252 configured to communicate with the client application 150 to read and write data with a local cache 260 and at least one secondary process 254 for storing the client application data. The processes in the cache framework 250 follow a RAID 0 striping strategy to store the data, in the form of keyed data sets, from the client application 150 across the processes.

Client application 150 is implemented as a JAVA application, which runs within a JAVA Virtual Machine ("JVM"). It will be apparent, however, that other types of native applications or middleware may be utilized with the striped data caching as will be apparent to those skilled in the art given the benefit of this disclosure. A noted above, client application 150 communicates with a data process set 250 implemented here as a cache framework, which may also utilize the exemplary hardware and software environment illustrated in FIG. 1. With continuing reference to FIG. 1, there exists a striped data process set 250, which contains processes 252, 254 hosting striped data in volatile memory. The data process set 250 includes a primary process 252 which has exclusive write access, at least one secondary process 254 with read only access. The data process set 250 is accessible by one or more client applications 150, and maintains a volatile data store for data that is frequently accessed by such applications. A client application 150 obtains data from the data process set 250 by issuing a "get" operation for a keyed data set, which first checks the local cache 160 on the client computer 100 running the client application 150. If the local cache 160 does not contain the entry a request is made to the primary process 252 in the data process set 250 to retrieve the keyed data set. In other embodiments, the primary process 252 may be running on a different computer 100 from the client application 150. The primary process 252 checks its local cache 260 for the requested data first. If the local cache 260 does not contain the keyed data set, a multicast parallel request is made to the secondary processes 254 of the data process set 250. When a quorum of responses is returned to the primary process 252 from the secondary processes 254, the keyed data set segments received from the secondary processes 254 are reassembled into the key data set and returned to the client application 150. The key data set may also be stored in the local caches 260, 160 of the primary process and client application. Keeping locally cached copies of the key data set may help retrieval times as the data may be retrieved directly from the local cache, bypassing the retrieval from the secondary processes and the reassembly of the key data set.

Striping refers to the segmentation of logically sequential data, such as a single file, so that segments may be written to multiple locations, traditionally multiple physical devices. The striping strategy utilized by the data process set 250, for example, may be any of a number of known RAID type striping scenarios, e.g. any of RAID-0, RAID-4, RAID-5, RAID-10, RAID-01, or other variations traditionally used in non-volatile storage arrays. Striping strategies may also include data redundancy techniques, including parity-based redundancy techniques (e.g. as provided by RAID-5). In the alternative, a striping strategy may not provide any data redundancy, with other high availability or other fault tolerant capabilities utilized to replicate the keyed data set.

The selection of a RAID implementation or alternate striping strategy for any embodiment will be based the requirements of the application that the data process set 250 is serving. In many cases, striping techniques enable the primary process to read or write data faster than a single process can supply or accept it. While data is being transferred from one of the secondary processes, another secondary process can locate the next segment. Because the data is hosted "off process" the primary process 252 may also be used for computation and transactions without being encumbered by a massive heap.

Figure 3:
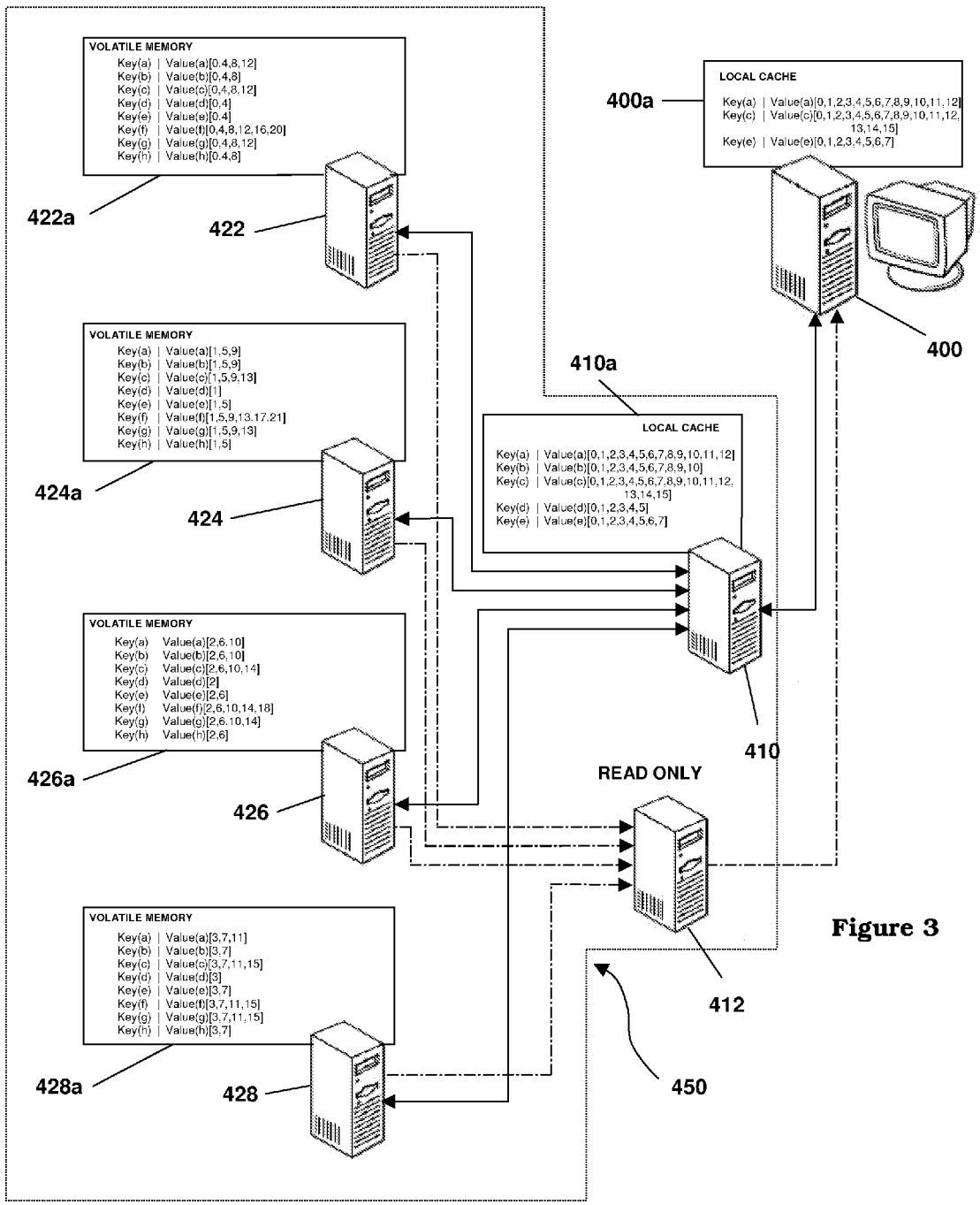
FIG. 3 is a diagram of an embodiment similar to that in FIG. 2, with the addition of a second primary process for performing read operations.

The distribution of the processes in the data process set 250 may vary over many embodiments. In one embodiment, the primary process and a secondary process may be colocated on the same computer and may or may not contain striped data values. In another embodiment, as shown in FIG. 3, there may be multiple primary processes. For example, one primary process may be dedicated to read operations and another primary process may be dedicated to write operations. In still another embodiment, the processes in the data process set 250 could be peers functioning as both primary and secondary processes.

Figure 2:
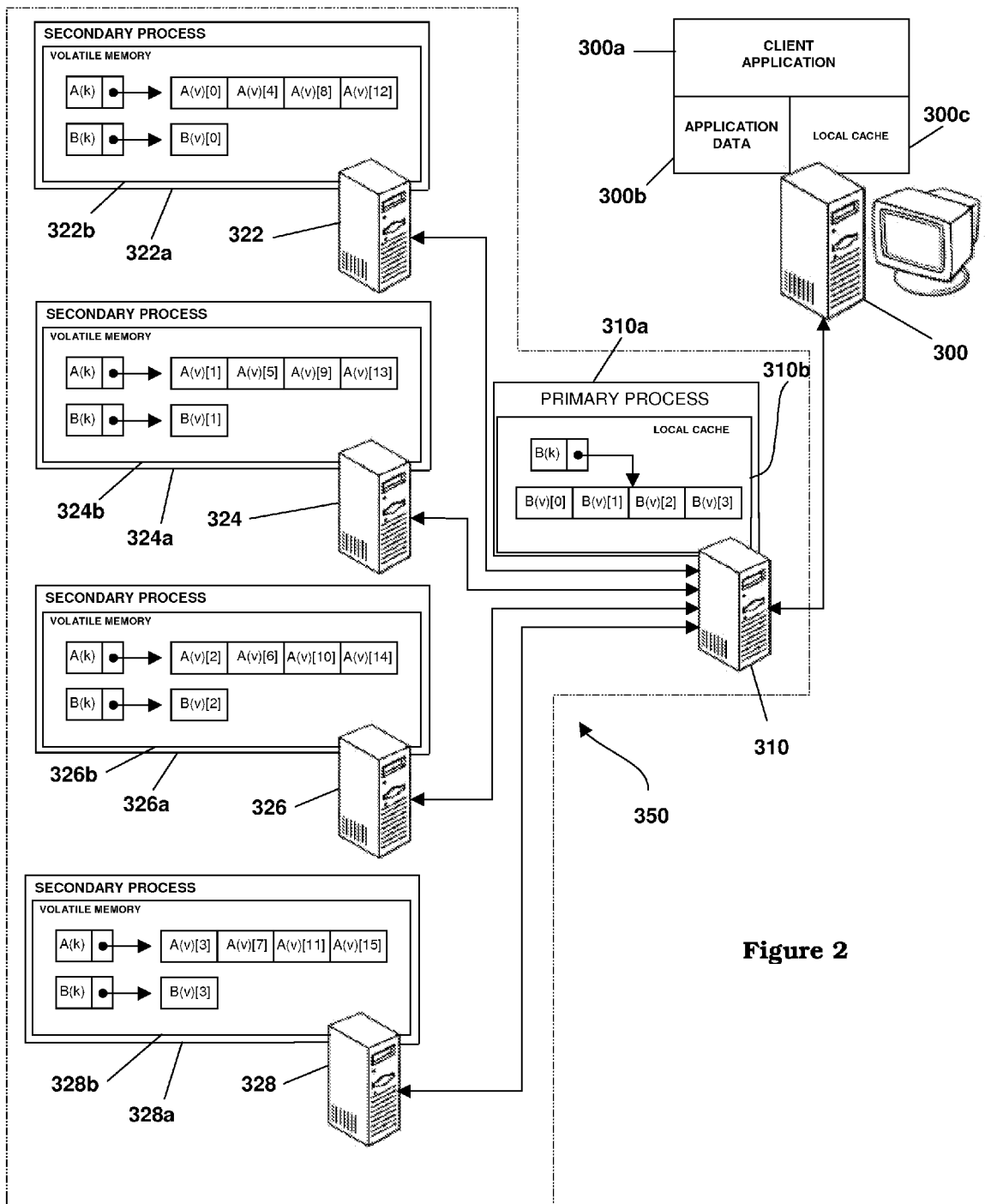
FIG. 2 is a block diagram of an exemplary distributed computer system utilizing a cache framework incorporating data striping consistent with the invention.

FIG. 2 illustrates an alternate embodiment where a data process set 350, such as is discussed in FIG. 1, is distributed across a cluster of computers, each hosting a single primary or a secondary process. The striping in this data process set 350 utilizes a RAID 0 striping strategy. Referring now to FIG. 2, an application 300a running on client computer 300 is utilizing objects A and B in a keyed data set. In this example, the keyed data A(k) is a 16 byte object and each secondary process 322a, 324a, 326a, 328a in the data process set 350 only hosts 4 of the 16 bytes. Keyed data B(k) is a four byte object. Each of the bytes of the keyed data B(k), B(v)[0]-B(v)[3], may be divided and stored among the secondary processes 322a, 324a, 326a, 328a of the data process set 350, each process hosting only one byte.

Assume that the client application 300a requires the object B from the keyed data set. The key allows for easy access to object B in the data set. When the data request is initially issued, the application 300a first checks its local cache 300c in the client computer 300. If the keyed data B(k) is not found, a request is made to the primary process 310a of the data process set 350 which is executing on the primary computer 310. The primary process 310a on the primary computer 300 checks its local cache 310b and finds a previously stored copy of the keyed data B(k) that is returned to the client computer 300 for use with the application 300a. This keyed data B(k) may also be stored at this point in the local cache 300c for the client computer 300.

With continued reference to FIG. 2, assume that the application 300a running on computer 300 now needs object A from the keyed data set. The application 300a checks the local cache 300c for the keyed data. If the keyed data is not found, the application 300a then requests the keyed data from the primary process 310a running on the primary computer 310. The primary process 310a checks its local cache 310b for the existence of the object from keyed data A(k). If the primary process 310a does not find the object, it sends out a request to the secondary processes 322a, 324a, 326a, 328a, which are running on secondary computers 322, 324, 326, 328. The secondary processes 322a, 324a, 326a, 328a on the secondary computers 322, 324, 326, 328 return the requested key data segments, A(v)[0]-A(v)[15] stored locally in volatile memory 322b, 324b, 326b, 328b to the primary process 310a running on the primary computer 310 where the keyed data segments are reassembled into object A. At this point, the keyed data may be stored in the local cache 310b of the primary process before being sent back to the application 300a running on the client computer 300.

The embodiment in FIG. 3 is similar to the embodiment shown in FIG. 2, but adds a second primary process, which is utilized for read operations only. The data process set 450 is distributed across a cluster of computers, each hosting a single primary or secondary process, and is accessible to client applications such as a client application running on client computer 400. Adding a second primary process may improve performance because either primary process running on either of the primary computers 410, 412 may return the keyed data requested by the application running on the client computer 400. In an application of the data process set 450 for the stock market as discussed above, where the read requests far outweigh the write requests, a performance increase in the retrieval of the keyed data from the multiple primary processes may be realized by the client applications. Other advantages to utilizing the second primary process for read operations as shown in this embodiment may be the ability of the data process set 450 to be able to simultaneously process read and write requests from the client application on the client computer 400.

With continued reference to FIG. 3, the data retrieved from the data process set 450 may be the entire data set, or may be a subset of the data set. For example, the keyed data set stored in the data process set 450 consists of eight key-value pairs, objects a-h of varying sizes, striped across volatile memory 422a, 424a, 426a, 428a in secondary processes running on secondary computers 422, 424, 426, 428. The client application running on client computer 400 may request any subset or all of the data in this particular data set. For example, the client application running on client computer 400 may request certain key-value pairs (objects a, c, & e) from the data process set 400. The key values are sent to either primary process running on primary computers 410, 412 to retrieve the objects associated with the keys. The primary process running on primary computer 410 receives the request and checks its local cache 410a for the key data values requested by the client application. If the data is found in the local cache, the data is then returned to the client application running on the client computer 400. The client application may then store the data in its own local cache 400a for further use.

If the key data values are not found in the local cache 410a of the primary process on the primary computer 410, then as above, the primary process sends out a request to the secondary processes running on the secondary computers 422, 424, 426, 428 to retrieve the key data segments. The segments are reassembled by the primary process, potentially stored in the local cache 410a of the primary process on the primary computer 410 and returned to the client application.

Communicating with the Data Process Set

Figure 4:
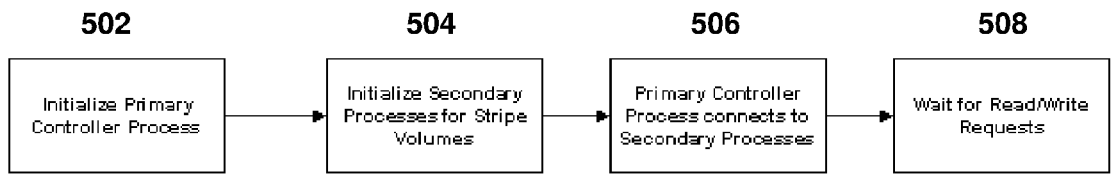
FIG. 4 is a flow diagram showing an exemplary data process set initialization process for use in the distributed computer system of FIG. 2.

FIGS. 4-9 next illustrate a number of processes that further describe data striping for a volatile data store in a manner consistent with the invention. A data process set may need to be initialized before it can host keyed data sets. The initialization determines the primary and secondary processes in the data process set and configures the processes according to the desired striping strategy. Once initialized, the data process set may begin hosting data from applications. The flow diagram in FIG. 4 illustrates a process in an embodiment that may be employed to initialize the data process set. Referring now to FIG. 4, the primary process is first initialized (block 502). After the primary process is available, secondary processes are initialized (block 504). These secondary processes may be located on the same computer as the primary process or they may be distributed across multiple computers that are able to communicate with one another. The primary process then connects to each of the secondary processes (block 506) to be able to communicate and transmit the keyed data set segments between the primary process and secondary processes. The communication may be accomplished over a network using standard networking protocols, or the communication may be internal connections between processes when the primary process and secondary processes are executing on the same computer. After the communications have been established, the data process set is ready to receive read and write requests (block 508) from the client applications. The data process set may also be populated with data from the client applications after initialization.

Figure 5:
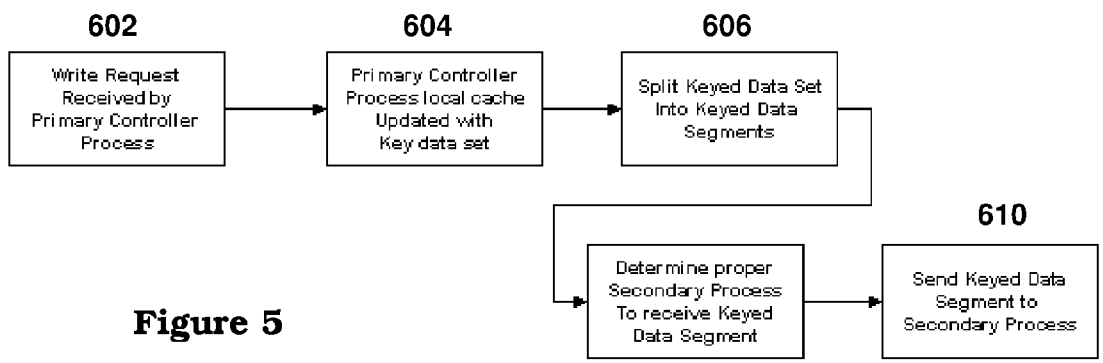
FIG. 5 is a flow diagram showing an exemplary write operation performed in the distributed computer system of FIG. 2.

When a client application sends a write request either to modify data or populate the data process set, the keyed data set in the write request may be divided up by the primary process based on the striping strategy implemented in the data process set. The flow diagram in FIG. 5 illustrates a process in an embodiment that may be employed to write keyed data sets to the data process set. Referring now to FIG. 5, a client application has made a determination to commit a keyed data set to a write. The write request with the keyed data set is received by the primary process (block 602). The primary process may store a copy of the keyed data set in a local cache, which is accessible by the primary process (block 604). The keyed data set is split into a series of keyed data segments (block 606) based on the striping strategy that is implemented in the data process set. The primary process then determines which secondary processes will host each of the key data set segments (block 608). The primary process then sends the keyed data set segments to their appropriate secondary process (block 610) in the data process set.

Figure 6:
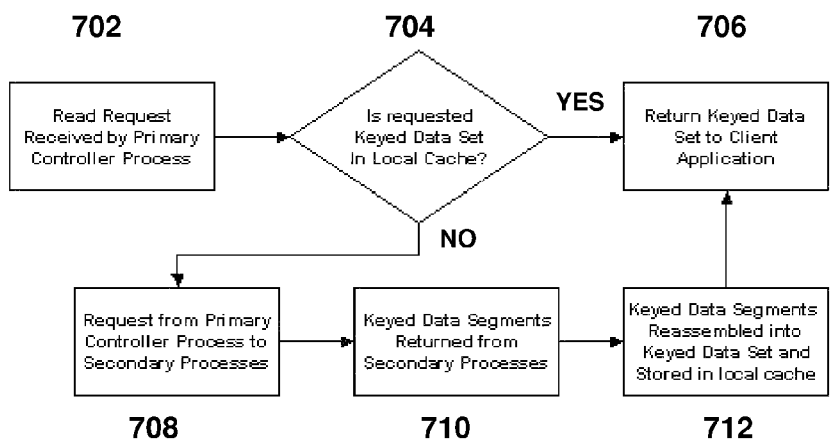
FIG. 6 is a flow diagram showing an exemplary read operation performed in the distributed computer system of FIG. 2.

The flow diagram in FIG. 6 illustrates a process in an embodiment that may be employed when a client application sends a read request to retrieve data from the data process set. Referring now to FIG. 6, the primary process receives a read request (block 702) from a client application. Initially the primary process may check its local cache for the requested keyed data set. If the requested keyed data set is in the primary process local cache (yes branch of decision block 704), the keyed data set is sent back to the client application and no further processing is necessary (block 706). If the keyed data set is not stored in the local cache for the primary process (no branch of decision block 704), the primary process makes a request to the secondary processes to return the keyed data set segments (block 708). The keyed data set segments are returned to the primary process from the secondary processes (block 710) based on the striping strategy that is implemented in the data process set. Once the keyed data set segments have been returned, the primary process may reassemble the keyed data set segments into the keyed data set and then may store the keyed data set in its local cache (block 712). Once the keyed data set has been reassembled, the keyed data set is returned to the client application (block 706).

Rebuilding the Data Process Set

When there is a loss of a process in the data process set several things may occur depending on the type of process and the type of striping strategy. The loss of the primary process in the data process set results in a secondary process in the data process set being upgraded to the primary process. When there is a loss of the primary process there may not be a need to rebuild the striped data set, as the changeover may only cause loss of data cached in the local cache accessible to the failed primary process. In a striping configuration with parity, a loss of secondary process member in the data process set typically causes no outage but a rebuild of the data may have to occur when a new secondary process member is added back to the group. Note that members could be waiting passively so membership changes can happen quickly.

Figure 7:
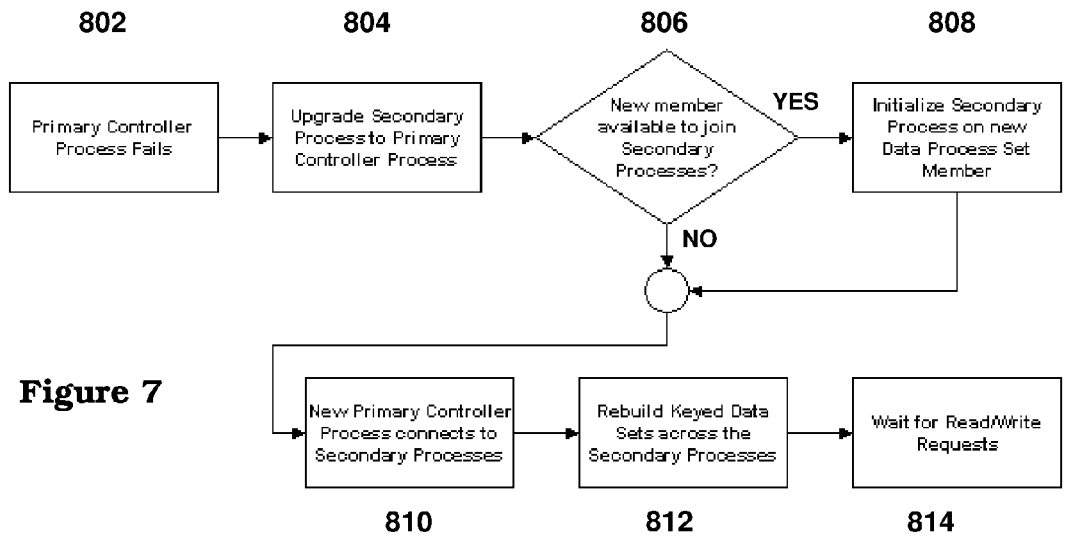
FIG. 7 is a flow diagram showing an exemplary primary process failure recovery process for use in the distributed computer system of FIG. 2.

The flow diagram in FIG. 7 illustrates a process in an embodiment that may be employed when there is a failure of the primary process in the data process set. Referring now to FIG. 7, after a failure of the primary process (block 802), the data process set will upgrade a secondary process in the data process set to the primary process (block 804). The data process set will check to see if there are any new members available to join the data process set. If a new member is available (yes branch of decision block 806), the data process set initializes a secondary process on the new member (block 808). After initialization or if there are no new members available (no branch of decision block 806), the new primary process connects to the secondary processes (block 810). Depending on the striping strategy that is implemented in the data process set, a rebuild of the keyed data sets across the secondary processes may need to be completed (block 812). Once the rebuild, if necessary, is complete, the data process set is ready again for read and write requests (block 814) from client applications.

Figure 8:
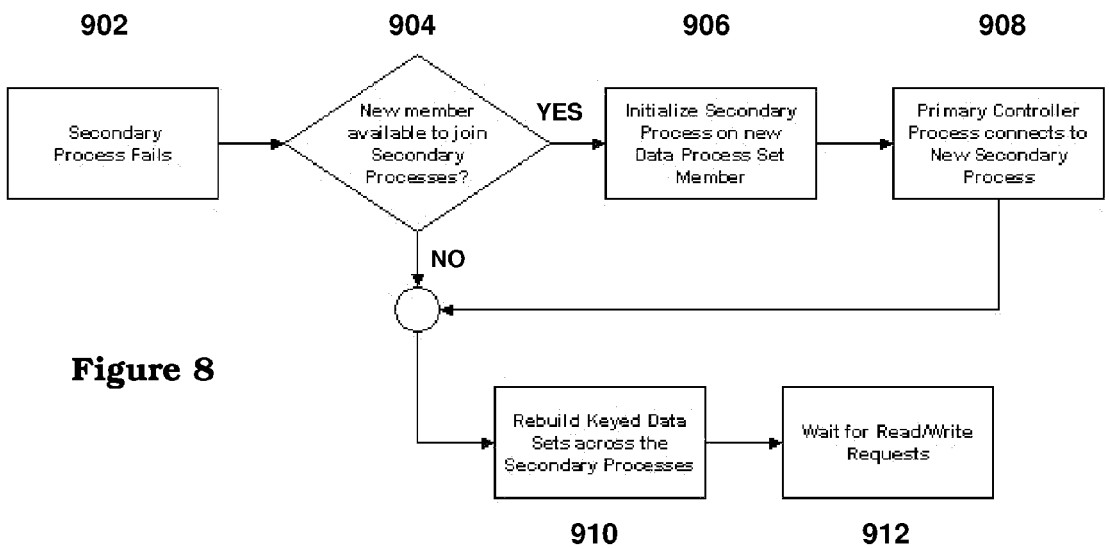
FIG. 8 is a flow diagram showing a secondary process failure recovery process for use in the distributed computer system of FIG. 2.

A loss of a secondary process may not require an upgrade of processes, but may include the addition of a new process to replace the failed process. The flow diagram in FIG. 8 illustrates a process in an embodiment that may be employed when there is a failure of a secondary process in the data process set. Referring now to FIG. 8, after a failure of a secondary process (block 902), the data process set checks to see if there are any new members available to join the data process set. If a new member is available (yes branch of decision block 904), the data process set initializes a secondary process on the new member (block 906). The primary process then connects to the new secondary process (block 908). After the connection, or if there were no new members available (no branch of decision block 904), the data may need to be rebuilt across the secondary processes, depending on the striping strategy implemented in the data process set (block 910). After the data has been rebuilt, if necessary, the data process set is ready to receive read and write requests (block 912) from client applications.

Figure 9:
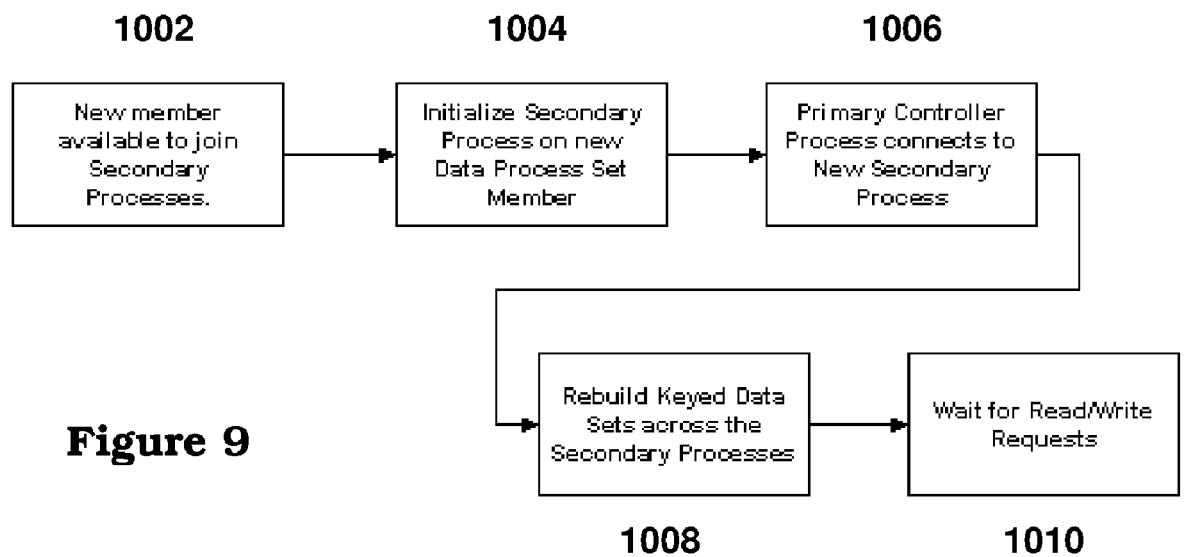
FIG. 9 is a flow diagram showing an exemplary process suitable for joining a new secondary process to a data process set in the distributed computer system of FIG. 2.

Additional secondary processes may be added to the process set even without a failure of a primary or secondary process. The flow diagram in FIG. 9 illustrates a process in an embodiment that may be employed when a secondary process is added to the data process set. Referring now to FIG. 9, a new member is available to join the data process set (block 1002). The data process set initializes a secondary process on the new member (block 1004). The primary process connects to the new secondary process (block 1006). Depending on the striping strategy that is implemented in the data process set, a rebuild of the keyed data sets across the secondary processes may need to be completed (block 1008). After the rebuild, if necessary, the data process set is ready to receive read and write requests (block 1010) from client applications.

From the forgoing disclosure and detailed description of certain illustrated embodiments, it will be apparent that various modifications, additions, and other alternative embodiments are possible without departing from the true scope and spirit of the present invention. For example, it will be apparent to those skilled in the art, given the benefit of the present disclosure that the distributed cache environment (data process set 250) can work with a variety of different striping strategies in an environment with client applications requiring vast amounts of volatile data. The embodiments that were discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A computer implemented method for caching data, the method comprising:
   striping value data associated with each of a plurality of keyed data sets across a plurality of processes in a data process set; and
   accessing a first keyed data set among the plurality of keyed data sets using at least one of the plurality of processes.

2. The method of claim 1, wherein striping the value data comprises, in a first process among the plurality of processes, dividing a keyed data set among the plurality of keyed data sets across the data process set based on a striping strategy.

3. The method of claim 2, wherein the striping strategy comprises a RAID striping strategy.

4. The method of claim 3 wherein the RAID striping strategy is a RAID 0 striping strategy.

5. The method of claim 2, wherein the first process is a primary process and each process in the data process set other than the first process is a secondary process, the method further comprising, in response to a failure in the first process, upgrading a secondary process from the data process set to a primary process.

6. The method of claim 2 further comprising re-dividing a keyed data set among the plurality of keyed data sets across the data process set based on a striping strategy in response to a change in the data process set.

7. The method of claim 1, wherein accessing the first keyed data set includes retrieving the first keyed data set from the data process set in response to a client request.

8. The method of claim 7, wherein retrieving the first keyed data set from the data process set comprises:
   retrieving at least one keyed data set segment from at least one secondary process among the plurality of processes in the data process set; and
   assembling the at least one keyed data set segment retrieved from the at least one secondary process into the keyed data set.

9. The method of claim 7, further comprising caching the keyed data set in a local cache.

10. The method of claim 7, wherein accessing the first keyed data set further includes checking a local cache for a copy of the keyed data set prior to attempting to retrieve the first keyed data set from the data process set.

11. The method of claim 10, wherein the local cache is accessible to a primary process among the plurality of processes in the data process set, and wherein retrieving the first keyed data set from the data process set includes sending a request from the primary process to at least one secondary process among the plurality of processes in the data process set if the keyed data set is not available in the local cache.

12. The method of claim 10, wherein the local cache is accessible to the client, and wherein retrieving the first keyed data set from the data process set includes sending a request from the client to a primary process among the plurality of processes in the data process set if the keyed data set is not available in the local cache.

13. The method of claim 12, wherein the local cache is a first local cache, and wherein retrieving the first keyed data set from the data process set further includes checking a second local cache accessible to the primary process for a copy of the keyed data set and sending a request from the primary process to at least one secondary process among the plurality of processes in the data process set if the keyed data set is not available in the second local cache.

14. The method of claim 1, wherein accessing the first keyed data set includes:
   sending the keyed data set from a client to a primary process among the plurality of processes in the data process set;
   dividing the keyed data set into at least one keyed data set segment with the primary process based on a striping strategy; and
   sending the at least one keyed data set segment to at least one secondary process among the plurality of processes in the data process set based on the striping strategy.

15. The method of claim 1, wherein striping the value data includes storing the value data in a cache framework.

16. The method of claim 15, wherein the cache framework is a volatile cache.

17. The method of claim 1, wherein the plurality of processes includes a primary process having exclusive write access to the keyed data set and a plurality of secondary processes having read access to the keyed data set.

18. The method of claim 1, further comprising rebuilding the keyed data set in response to a failure in one of the processes in the data process set.

19. The method of claim 1, wherein the data process set hosts all of the keyed data set.

20. An apparatus comprising:
   a memory; and
   program code, resident in the memory, the program code configured to stripe value data associated with each of a plurality of keyed data sets across a plurality of processes in a data process set, and access a first keyed data set among the plurality of keyed data sets using at least one of the plurality of processes.

21. The apparatus of claim 20, wherein the program code is configured to stripe the value data by, in a first process among the plurality of processes, dividing a keyed data set among the plurality of keyed data sets across the data process set based on a striping strategy.

22. The apparatus of claim 20 wherein the program code is further configured to re-divide a keyed data set among the plurality of keyed data sets across the data process set based on a striping strategy in response to a change in the data process set.

23. A program product, comprising:
   program code configured to stripe value data associated with each of a plurality of keyed data sets across a plurality of processes in a data process set, and access a first keyed data set among the plurality of keyed data sets using at least one of the plurality of processes; and
   a computer readable storage medium bearing the program code.

24. The program product of claim 23, wherein the program code is configured to stripe the value data by, in a first process among the plurality of processes, dividing a keyed data set among the plurality of keyed data sets across the data process set based on a striping strategy.

25. The program product of claim 23 wherein the program code is further configured to re-divide a keyed data set among the plurality of keyed data sets across the data process set based on a striping strategy in response to a change in the data process set.

* * * * *